3,070,537
Patented Dec. 25, 1962

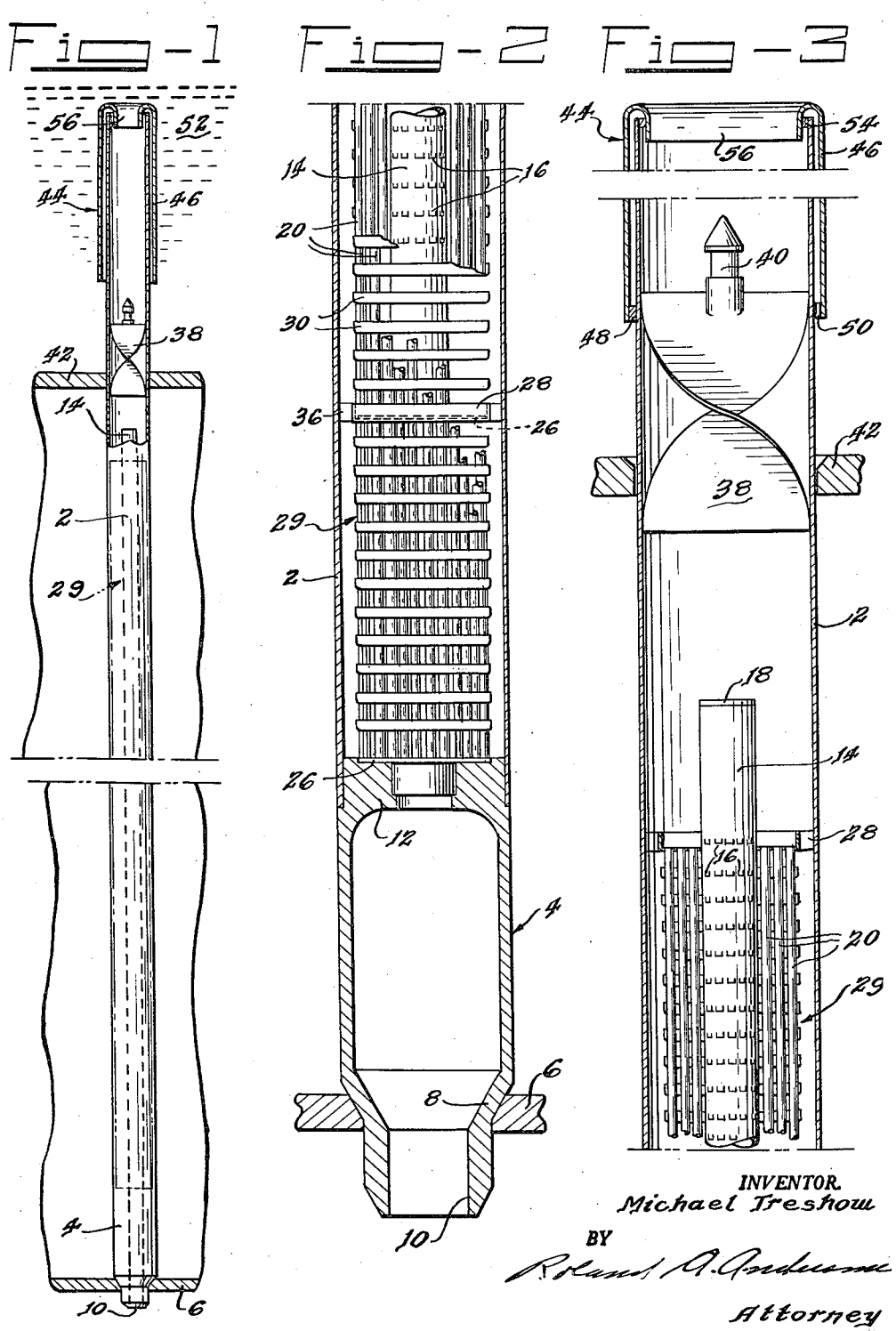

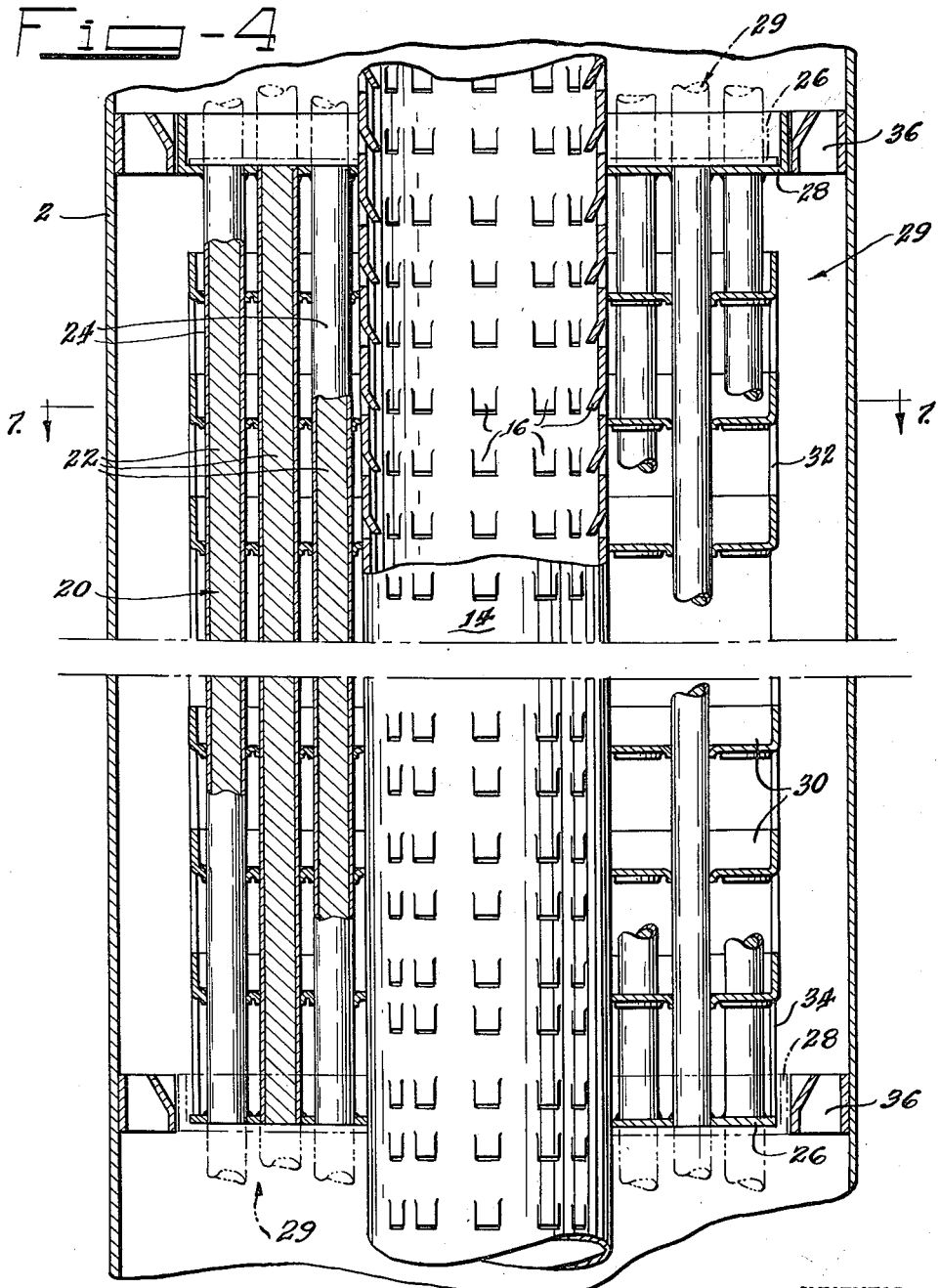

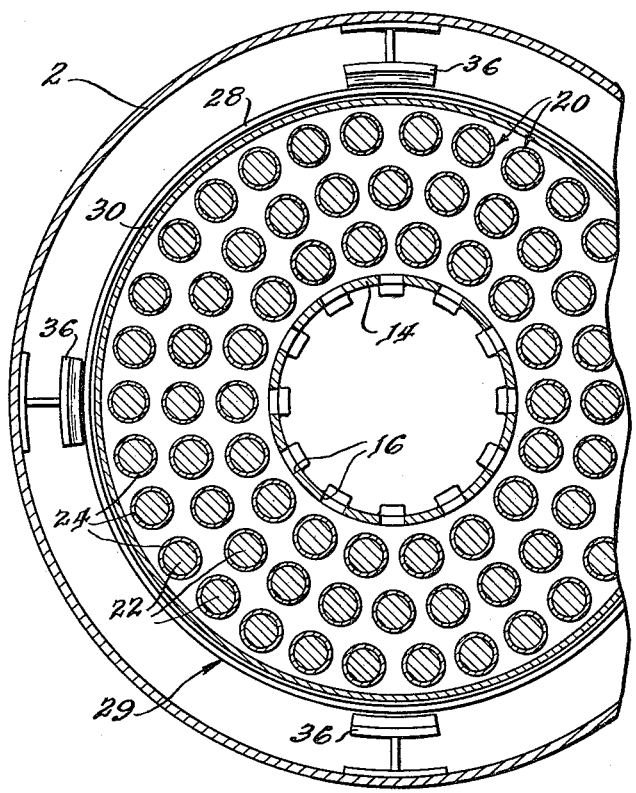
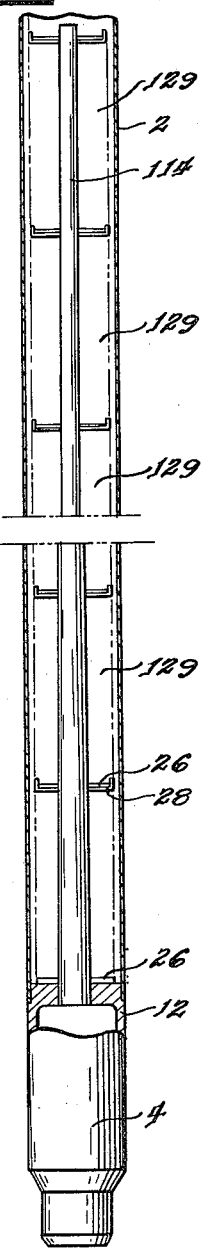

3,070,537
FUEL SUBASSEMBLY CONSTRUCTION FOR RADIAL FLOW IN A NUCLEAR REACTOR
Michael Treshow, Del Mar, Calif., assignor to the United States of America as represented by the United States Atomic Energy Commission
Filed Nov. 17, 1960, Ser. No. 70,088
3 Claims. (Cl. 204—193.2)

The present invention is a fuel assembly for a boiling water nuclear reactor. This assembly has greatly improved heat transfer capabilities in such a reactor and can increase the overall heat output of the reactor.

Present practice in reactors of this type is to arrange the fuel elements in a horizontal array and to pass coolant water in a direction parallel to the length of the fuel elements. Under this arrangement the upper portion of the fuel elements are cooled by contact with water containing a large volume fraction of steam bubbles. Since steam is a heat transfer medium of relatively low efficiency, a limit is placed on the power output of the reactor.

The long coolant passage also offers more resistance to flow, requiring more pumping power with forced circulation, or in the case of natural convection circulation, limits the flow and thereby further decreases available power.

The object of this invention is the increase in steam output of a boiling water reactor without increasing size or inventory of fissionable material. This is accomplished by causing steam to be removed from the coolant stream so that downstream cooling is not impaired.

It is a further object of this invention to reduce differences in fuel element temperatures by providing a uniform temperature of coolant for all axial positions of fuel.

The present invention overcomes this difficulty by causing the coolant to flow radially past the fuel elements, a much shorter path. The steam bubbles formed during this passage are swept away from the narrow channels between fuel elements into an annular chamber exterior to the elements where flow is much less restricted. There is less resistance to the upward flow of water and steam. Further, liquid water contacts the elements along the entire length, improving heat removal. Therefore, the zone of the reactor where heat generation is at a maximum receives adequate liquid water flow. In the normal boiling water reactor, the zone just above center has the largest steam void fraction, since steam formation is progressive as the coolant travels upward. As is well known in the art, heat generation rates are distributed axially along a cosine curve. There is therefore a wide band at the center having nearly maximum heat generation. Since the heat transfer properties decrease with steam fraction, there is a coolant deficiency somewhere between the center and an intermediate point above the center.

This fuel element assembly is ideally suited to be employed in the heavy water reactor of Untermyer, U. S. Patent 2,936,273, "Steam Forming Neutronic Reactor and Method of Operating It," to which reference is made. In this reference the reactor proper is sufficiently described, so as to remove any need for a detailed description of a reactor in this case. The embodiment chosen is the second example, which uses cylindrical assemblies of twisted ribbon fuel elements in the Untermyer application.

The Untermyer application is further relied on for further references regarding nuclear reactor theory and calculations. These calculations make available methods for varying the dimensions, fissionable material composition, and content to suit reactors of varying size and composition.

The workings and advantages offered by the fuel assembly of the present invention is readily understood by reading the specification, particularly when viewed while examining the drawings in which:

FIGURE 1 is an isometric view of a fuel assembly according to the present invention, with the upper portion partially cut away and in section.

FIGURE 2 is an enlarged sectional view of the lower portion of the fuel assembly shown in FIGURE 1.

FIGURE 3 is an enlarged sectional view of the upper portion of the fuel assembly of FIGURE 1.

FIGURE 4 is a further enlarged sectional view of the upper portion of FIGURE 2 showing a simple fuel subassembly.

FIGURE 5 is a cross sectional view of FIGURE 4 taken at the point and in the direction shown by the arrows.

FIGURE 6 is a partially cut away isometric view of the lower portion of a fuel assembly, showing an alternative construction of a fuel assembly.

As shown in FIGURE 1, the basic fuel assembly container 2 in a tube of zirconium alloy 6" O.D. with a 1/16" wall 14 1/2 feet long. This tube fits into a lower grid fitting 4 also of zirconium alloy which is supported by a reactor bottom grid 6 forming a part of the boiling water reactor. This support is by means of a conical section 8 engaging the conical surface of openings in the bottom grid 6. Bottom opening 10 is for coolant ingress, either by natural convection circulation or by pressure forced circulation. The top of lower grid fitting 4 is turned to accommodate tube 2 to a depth of about 1 1/2". Lower grid fitting 4 is also centrally bored to a diameter of 1.875" and counter bored from the top to 2.003" for a depth of 1 1/2". The upper wall 12 of lower grid fitting 4 is approximately 2" thick.

Into the counter bore of lower grid fitting 4 is placed header tube 14 also of zirconium alloy. This header tube is 2" O.D. with a wall .050" thick, 13'6" long. At a point 1 3/4" above the bottom of header tube 14 as shown in more detail in FIGURE 4, a plurality of circumferentially equally distributed inward projections 16 are made by slitting horizontally through said tube a number of equally spaced, approximately 1/4" wide penetrations. The metal is then pushed inwardly above the slit to project the metal inwardly in trough formation. The projections so made are repeated each 1/2 inch of vertical height until 12' is reached. The top of header tube 14 is closed by sealing with a disc 18 (see FIGURE 3).

The fuel proper consists of 864 fuel rods 20. Each fuel rod 20 is .278" in diameter, 12" long. It is made up of a rod 22 of uranium 93 1/2%, zirconium 5%, niobium 1 1/2%, (all percentages by weight) in which the uranium is the naturally occurring mixture of isotopes. This uranium rod 22 is encased in a metallurgically bonded envelope 24 of zirconium alloy .020" thick.

Bottom grid discs 26 are annular discs of zirconium alloy 1/16" thick, 4 3/4" O.D., and 2.005" I.D. These discs are pierced by a series of 18, 24, and 30 0.280" diameter, equally spaced holes distributed around 2 7/16", 3 5/16", and 4 1/8" diameter circles, concentric with the I.D. and O.D. of the discs.

Top grid trays 28 are also of zirconium alloy. They are discs of 4 15/16" O.D., 2.005" I.D., 1/16" thickness with an upward bent rim at right angles to the periphery extending upwards 1/2". These grid trays are pierced with the same number of 0.280" holes in the same positions as in the grid discs 26. Bottom grid discs 26 and top grid trays 28 form the bottom and top of fuel subassemblies 29.

Intermediate trays 30 forming part of fuel subassemblies 29 correspond with the dimensions and material with top grid tray 28, except that the zirconium alloy is .040" thick and the rim extends only 3/8" upward.

Four spacer strips 32 of zirconium alloy .040" thick by 1/4" wide by 1/2" long are secured to the intermediate trays 30 preferably by inert arc welding at points equally distributed about the periphery thereof to support the trays 30 located thereabout.

Four bottom support strips 34 of zirconium alloy 1/16" thick by 1/4" by 7/8" are secured to bottom grid discs 26 such as to extend upward 7/8".

To make a fuel subassembly 29, the holes of one bottom grid disc 26, eleven intermediate trays 30 and top grid tray 28 are aligned. Spacing is maintained by support strips 34 and spacer strips 32. Seventy-two fuel rods 20 are then fitted into the holes and the rods tack welded to the top grid tray 28 and the bottom grid disc 26. This subassembly, completed as above is slipped over header tube 14, to rest on upper wall 12 of lower grid fitting 4. Eleven more such subassemblies 29 are so constructed and positioned above the previously installed subassembly 29. Four radial supports 36 are secured to the container tube 2, wherever it adjoins a top grid tray 28.

Above the uppermost fuel subassembly 29, a spiral deflector 38 of zirconium alloy, conforming to the inside diameter of tube 2 is inserted therein. It consists of a 1/16" by 5 7/8" by 6" sheet of alloy, twisted around the 6" long axis. At the top of deflector 38 lifting knob 40 is placed at the axis of twist of 38. This spiral deflector 38 is present to cause rotation of upcoming steam and water mixtures, and to drive the water outward toward the periphery of tube 2.

The upper portion of container tube 2 fits snugly into upper grid 42, upon which it depends for maintenance of spacing. As shown in FIGURES 1 and 3, each of steam separators 44 has an outer sleeve 46, concentrically disposed and spaced from the top of container tube 2. A ring 48 attached to container tube 2 adjacent to the lower end of outer sleeve 46 of the steam separator supports the outer sleeve 46 and is provided with apertures 50 so to permit coolant between the sleeve 46 and container tube 2 to return to the main body of coolant 52 which is maintained at a slightly higher level than the top of the steam separator 44. A second perforated ring 54 is disposed within the container sleeve 2 adjacent to its top. The outer sleeve 46 has a lip 56 which extends about the mouth of the container tube 2 and is secured to the perforated ring 54.

Steam exiting from the fuel element subassemblies 29 tends to pass through the steam separator 44 along its axis while water tends to be swirled to the container 2 wall of the separator. As a result coolant will pass through the perforations in the perforated ring 54 and downwardly between the container tube 2 and the outer sleeve 46, through the apertures 50 in the perforated ring 48 to rejoin the main body of coolant 52.

In operation the entire fuel assembly is filled with liquid coolant, except for the space occupied by the vapor bubbles during their upward passage. Coolant enters the opening 10, either under natural or forced circulation. This coolant leaves header tube 14 by means of the inward projections 16, flowing in a radial direction past fuel rods 20. Vapor generated in the fuel assembly is swept past the fuel rods into the passage between the trays 30 and the container 2 where it has an uninterrupted path to the steam separator 44. The steam generated in one flow past fuel rods does not pass by other fuel rods or other portions of the same rod to impair heat transfer properties. This feature allows operation of the reactor at a power level (25%) above the possibilities with reactors constructed according to the prior art.

A second embodiment is to be found in FIGURE 6. This embodiment differs in that header tube 114 tapers from bottom to top as the need for carrying coolant decreases. Each subassembly 129 has progressively smaller openings in the bottom disc 26, top grid tray 28, and intermediate trays 30 to accommodate the diameter of header tube 114 at the point of encounter. A further modification would be uniform central openings in top tray 28 and intermediate trays 30 to coincide with the central openings in bottom grid disc 26 for each subassembly 129.

In this specification coolant applies to any coolant moderator boiling at reasonably low temperatures. In the specific example shown, as applied to the reactor of the reference, heavy water ($D_2O$) is to be used.

Zirconium alloy may be any reasonably corrosion resistant alloy, but in the particular fuel assemblies of the example, Zircaloy 2, an alloy of approximately 1 1/2 % tin, 0.12% iron, 0.10% chromium, and 0.05% nickel with the balance substantially all zirconium is employed.

Each of the fuel assemblies contain 283 pounds of fuel alloy. The uranium content of a fuel assembly is 265 pounds each. This uranium has the isotope distribution found in nature.

It will be understood that this invention is not to be limited to the details given herein but that it may be modified within the scope of the appended claims.

What is claimed is:

1. A fuel assembly for a boiling reactor comprising an outer container tube, a plurality of fuel rods arranged in concentric circles inside of said tube, a central tube coaxially positioned in said outer container tube, said central tube having a plurality of slits with adjacent trough shaped inner projections and a plurality of spaced annular trays extending outward from said central tube and spaced from said outer tube.

2. The fuel assembly of claim 1 in which the fuel elements are less than full length and are assembled to trays in subassemblies.

3. A fuel assembly for a boiling reactor comprising a plurality of similar subassemblies disposed along a common axis, said subassemblies in turn comprising a plurality of spaced annular trays with upturned cylindrical edges, a plurality of fuel rods passing through openings in said trays evenly distributed along spaced concentric circles, a flat grid disc fitted and attached to each of said fuel rods at its bottom and an annular top grid tray with upturned periphery, fitted and attached to each of said fuel rods at its top, said annular top grid tray being of such size as to permit entry of the flat grid disc of the adjacent subassembly, an outer container tube coaxially disposed around said subassemblies at a substantial distance therefrom; and a header tube closely fitting into the opening of said annular trays and having a plurality of slits with adjacent trough shaped inner projections disposed between said annular trays.

References Cited in the file of this patent

UNITED STATES PATENTS

| 2,938,845 | Treshow | May 31, 1960 |
| 2,977,297 | Evans et al. | Mar. 28, 1961 |
| 2,985,575 | Dennis et al. | May 23, 1961 |
| 3,000,728 | Long et al. | Sept. 19, 1961 |
| 3,028,329 | Mahlmeister | April 3, 1962 |

FOREIGN PATENTS

| 11,846 | Great Britain | July 4, 1896 |
| 137,887 | Germany | Jan. 7, 1903 |
| 504,257 | Germany | Aug. 1, 1930 |
| 797,608 | Great Britain | July 2, 1958 |
| 571,145 | Belgium | Sept. 30, 1958 |
| 1,196,192 | France | May 25, 1959 |
| 1,211,585 | France | Oct. 12, 1959 |
| 1,218,526 | France | Dec. 21, 1959 |
| 847,220 | Great Britain | Sept. 7, 1960 |